US006704344B1

United States Patent
Hu et al.

(10) Patent No.: US 6,704,344 B1
(45) Date of Patent: Mar. 9, 2004

(54) BROAD-BRAND MPSK SPREAD SPECTRUM COMMUNICATIONS RECEIVER WITH CARRIER RECOVERY AND TRACKING USING CORRELATION TECHNIQUES

(76) Inventors: Aiqun Hu, Si Pai Lou 2, Nanjing (CN), 210096; Tung Sang Ng, A17, Block 1, 23 Sha Wan Drive, Hong Kong (CN); Donghai Guo, 50-C, 6/F, Broadway Street, Mei Foo Sun Chuen, Kowloon, Hong Kong (CN)

( * ) Notice: Subject to any disclaimer, the term of this patent is extended or adjusted under 35 U.S.C. 154(b) by 0 days.

(21) Appl. No.: 09/383,662

(22) Filed: Aug. 26, 1999

Related U.S. Application Data (60) Provisional application No. 60/098,679, filed on Sep. 1, 1998, and provisional application No. 60/098,680, filed on Sep. 1, 1998.

(51) Int. Cl.[7] .............................. H04L 27/06; H04K 1/00
(52) U.S. Cl. ........................ 375/130; 375/344; 329/309
(58) Field of Search ................................ 375/321, 344, 375/327; 370/215; 329/309; 359/124

(56) References Cited

U.S. PATENT DOCUMENTS

| 4,866,395 A | * | 9/1989 | Hostetter | ................... 329/309 |
| 5,875,215 A | * | 2/1999 | Dobrica | ...................... 375/344 |

* cited by examiner

*Primary Examiner*—Stephen Chin
*Assistant Examiner*—Edith Chang (57) ABSTRACT

This invention relates to a broad band spread spectrum communications receiver with carrier recovery and tracking based on multiple phase shift keying (MPSK) techniques. The receiver comprises three subsystems: the synchronization system, the carrier tracking system and the data demodulation system. To demodulate the received signal, the receiver requires a carrier frequency that matches that of the transmitter as well as the chip and symbol clocks that are synchronized with those of the transmitter. In the disclosed system the carrier tracking subsystem continually tracks the carrier frequency of the received signal using a tracking scheme which is based on correlation techniques. The synchronization subsystem synchronizes the symbol clock and chip clock. These three subsystems interact with each other and result in an improved bit error rate (BER) performance.

8 Claims, 10 Drawing Sheets

BROAD-BRAND MPSK SPREAD SPECTRUM COMMUNICATIONS RECEIVER WITH CARRIER RECOVERY AND TRACKING USING CORRELATION TECHNIQUES

RELATED APPLICATIONS

The subject application claims the priority of provisional patent application Nos. 60/098,679 and 60/098,680, both filed on Sep. 1, 1998.

FIELD OF THE INVENTION

This invention relates generally to spread spectrum communications systems. In particular the disclosed apparatus and method for carrier recovery in MPSK modulated systems are based on correlation techniques.

BACKGROUND OF THE INVENTION

Communication systems exist in various forms. Generally speaking, a communication system is designed to transmit information-embedding signals from a source to a destination. A communication system usually consists of three components: a transmitter, a channel and a receiver. The function of the transmitter is to process (also known as modulate) the information data into such a form that it can be transmitted through a channel. The channel provides a physical medium for signal transmission between the transmitter and the receiver. Examples of a channel are coaxial cable, optical fiber, and the air. A practical channel usually distorts the signal by addition of noises and time delay when the signal passes through it. The function of the receiver is to receive the transmitted signal and process (also known as demodulate) it to obtain the original information data. Since the signal received from a practical channel is usually distorted and delayed, the receiver requires mechanisms such as equalization, synchronization and so on to assist the data demodulation.

One type of communication systems is the mobile communication system, in which the signal is transmitted in the form of electromagnetic waves and the transmission medium is the air. The mobile phone communication system is a typical example of this type of communication system.

One type of mobile communication systems is Code Division Multiple Access (CDMA) system, which uses spread spectrum techniques. In this type of system the frequency bandwidth of the transmitted signal is much larger than the information bandwidth. Spread spectrum systems perform better in the presence of narrow band noise interference and multiple user interference. Direct Sequence Code Division Multiple Access (DS-CDMA) is one of the CDMA types. In a DS-CDMA system the transmitter spreads the data stream using a given spreading code in the time domain. Orthogonal codes are often employed among different users to minimize multi-user interference. The received signal is correlated with the user spreading code so that only the desired user signal is enhanced while signals from other users are de-emphasized. In this way users can share the same time and frequency slot.

Various modulation schemes can be used in DS-CDMA systems. One of the commonly used modulations is Multiple Phase Shift Keying (MPSK), in which the serial data is grouped into $\log_2 M$-bit symbols. The well known binary phase shift keying (BPSK) and quadrature phase shift keying are particular ones of MPSK, where M=2 and M=4, respectively. Each information data bit is modulated with a pseudo-noise code (PN code) of length N. The spreaded data symbols are up-converted and transmitted by a carrier of frequency $f_c$.

BRIEF DESCRIPTION OF THE EMBODIMENTS

DETAILED DESCRIPTION OF THE DRAWINGS

Figure 1:
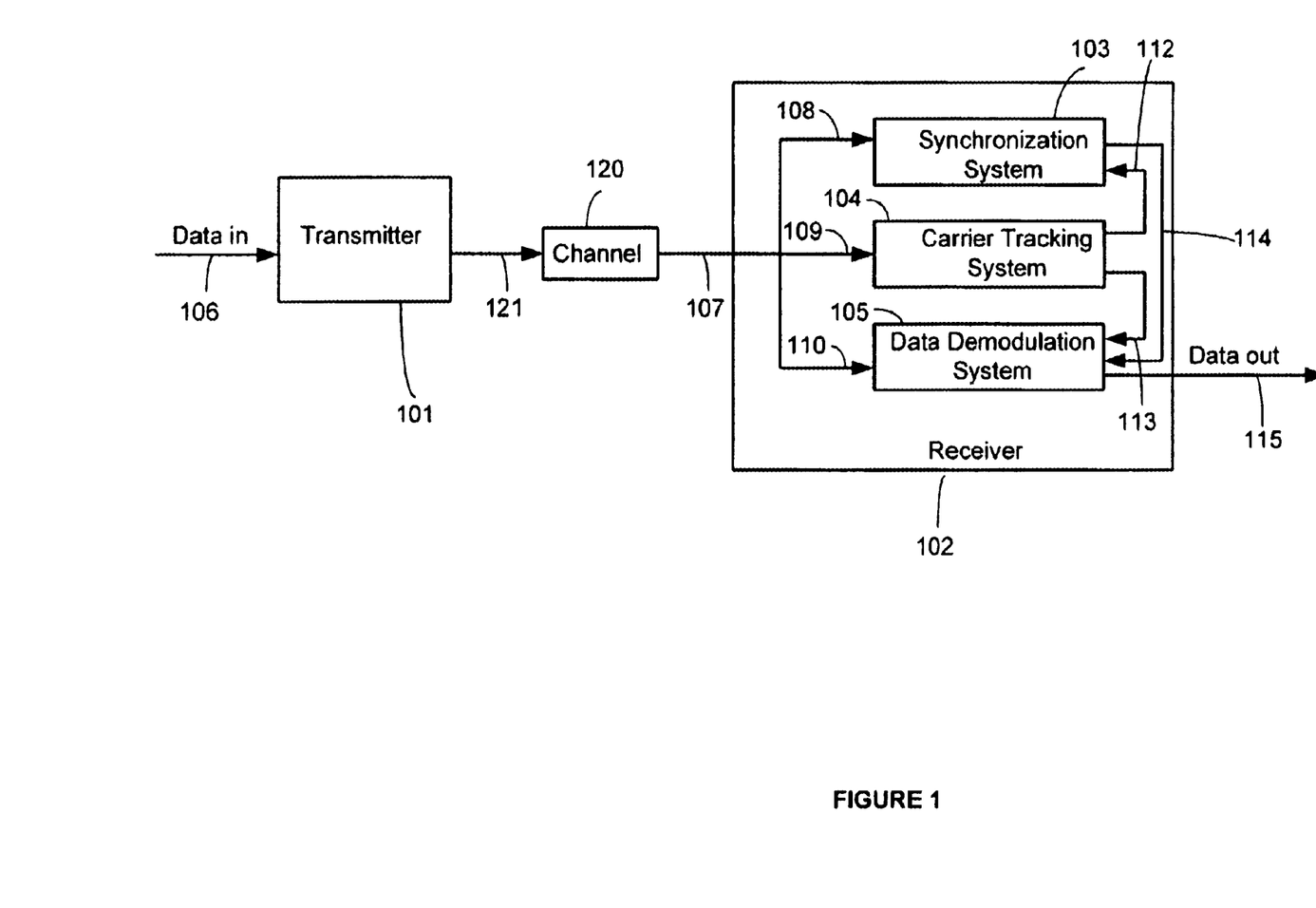
FIG. 1 is the block diagram of the proposed communication system.

FIG. 1 shows the structure of the proposed communication system. The system comprises a transmitter 101, a channel 120 and a receiver 102. The receiver comprises three subsystems: the synchronization system 103, the carrier tracking system 104 and the data demodulation system 105. The information data is fed to the transmitter 101, where it is processed and transmitted as the signal 121 through the channel 120. The transmitted signal which has passed through the channel 120 is denoted as signal 107. Receiver 102 receives the signal 107 and passes it on to the three subsystems 103, 104 and 105. The disclosed apparatus for carrier recovery is employed in the carrier tracking subsystem 104. The said carrier tracking subsystem 104 supplies control signal 112 to said synchronization subsystem 103 and adjusted frequency 113 to said data demodulation subsystem 105. The synchronization subsystem 103 supplies synchronized clock 114 as a synchronization signal to the data demodulation subsystem 105. With the adjusted frequency 113 from said carrier tracking subsystem 104 and the synchronized clock 114 from said synchronization subsystem 103, the data demodulation subsystem 105 demodulates the received signal 110 into information data 115.

Figure 2:
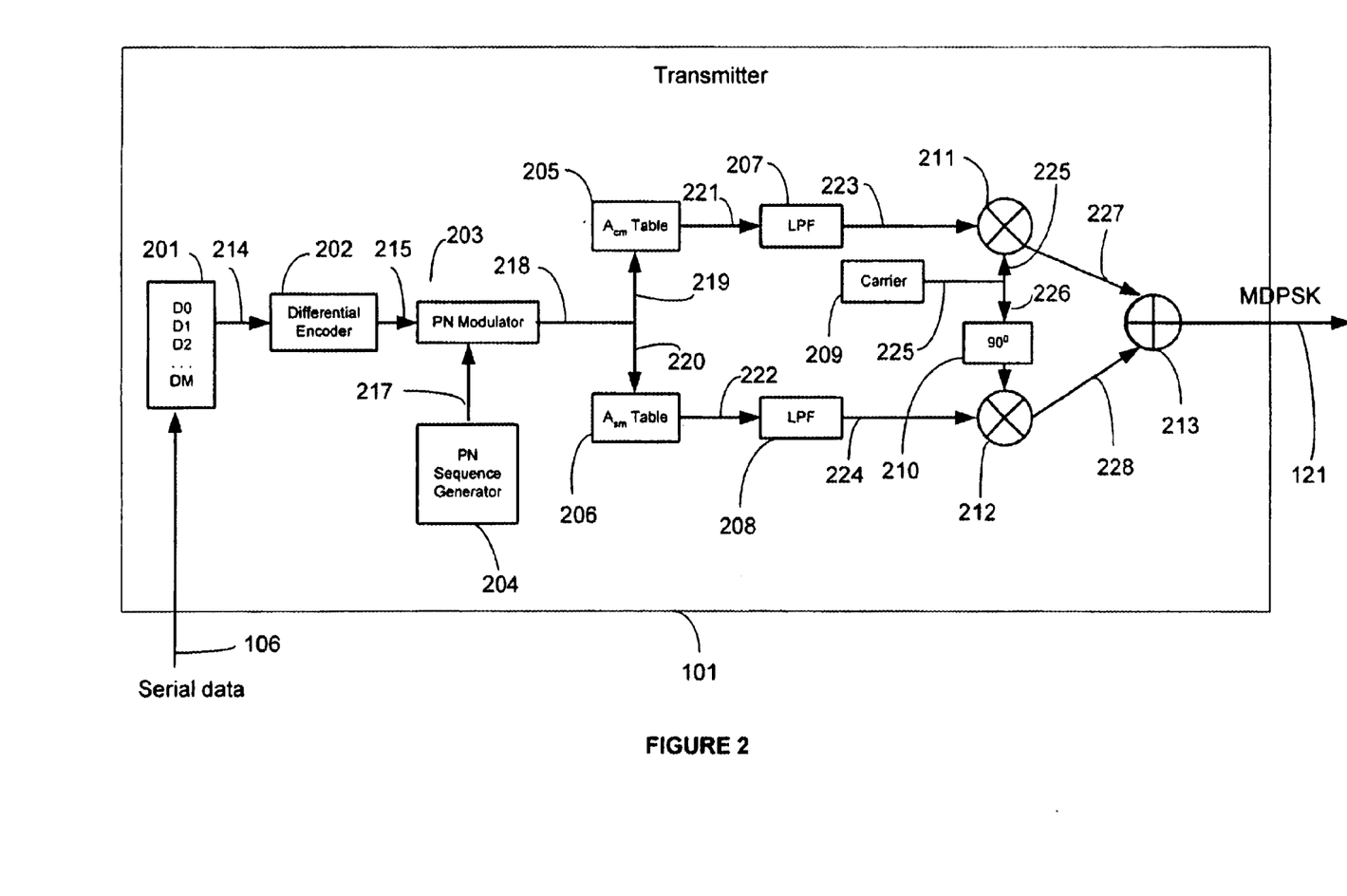
FIG. 2 is the block diagram of the transmitter of FIG. 1.

FIG. 2 shows the detailed structure of the transmitter 101. It essentially comprises a serial-to-parallel converter 201, a differential encoder 202, a PN modulator 203, a PN sequence generator 204, two lookup tables storing the cosine and sine values of different phases, namely, the Acm table 205 and the Asm table 206, respectively, two low pass filters 207 for the I-channel and 208 for the Q-channel, a carrier table 209, an orthogonal phase shifter 210, two multipliers 211 for the I-channel and 212 for the Q-channel and an adder 213. Said serial-to-parallel converter 201 groups every m bits of the serial data 106 into one symbol 214 and each symbol is mapped into $2^m$=M different phases. The m-bit symbols 214 go through the differential encoder 202. The output 215 of said differential encoder 202 is fed to said PN modulator 203, in which these phases are modulated by the PN-sequence 217 supplied by said PN sequence generator 204. The m-bit outputs 218 of said PN modulator 203 are used as addresses 219 and 220 for looking up tables Acm table 205 and Asm table 206, which store the cosine and sine values of M different phases, respectively. Low pass filters 207 and 208 limit the bandwidth of the I- and Q-path signals 221 and 222 before they modulate the carrier 225 from the carrier table 209. The I- and Q-path signals 227 and 228 are combined in adder 213 and transmitted as MDPSK signals 121 for further up-conversion.

Figure 3:
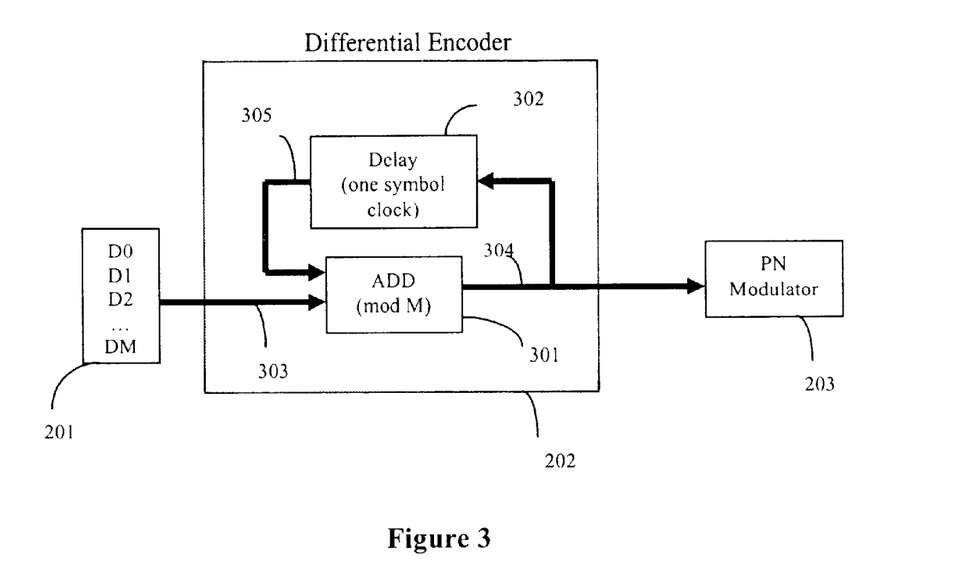
FIG. 3 is the block diagram of the differential encoder of FIG. 2.

FIG. 3 shows the structure of said differential encoder 202 of FIG. 2. It essentially comprises an m-bit modulo adder 301 and an m-bit D flip flop 302. The m-bit symbol 303 is fed to said adder 301, wherein it is added with the successive result 305 of said adder 301, which was delayed by said D flip flop 302 for one symbol duration. The addition operation is modulo-M based, where M represents the number of the phases, herein specifically $2^m$=M.

Figure 4:
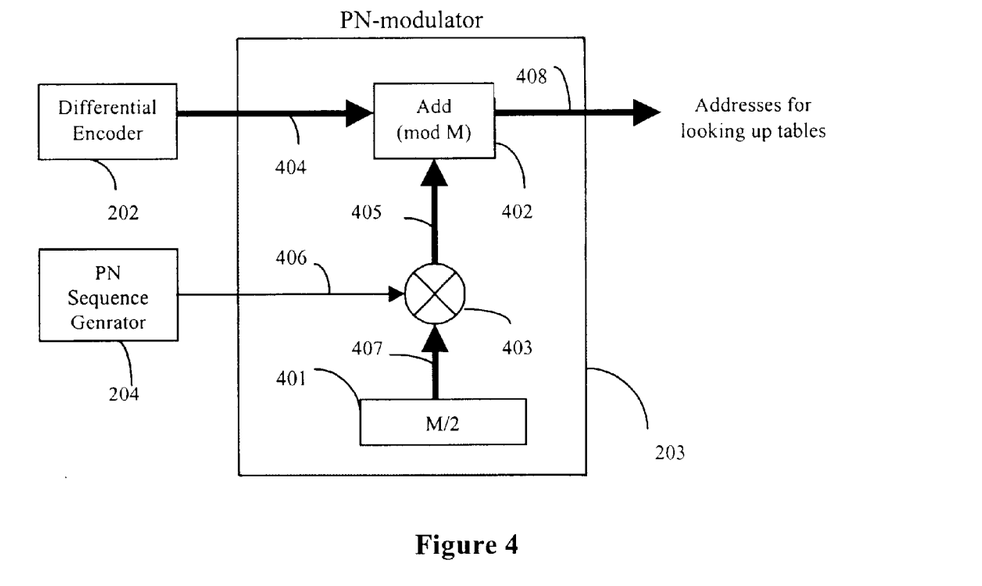
FIG. 4 is the block diagram of the PN-modulator of FIG. 2.

FIG. 4 shows the structure of said PN modulator 203 of FIG. 2. The PN sequence 406 of K chips in length comes from said PN sequence generator 204 of FIG. 2. Each chip is multiplied at multiplier 403 with M/2 from register 401. The multiplication result 405 is supplied to the adder 402, wherein it is added with the symbol 404 from said differential encoder 202 of FIG. 2. The addition operation is M-modulo based, where M represents the number of phases. The addition result 408 is used as addresses for looking up said tables 205 and 206 of FIG. 2.

Figure 5:
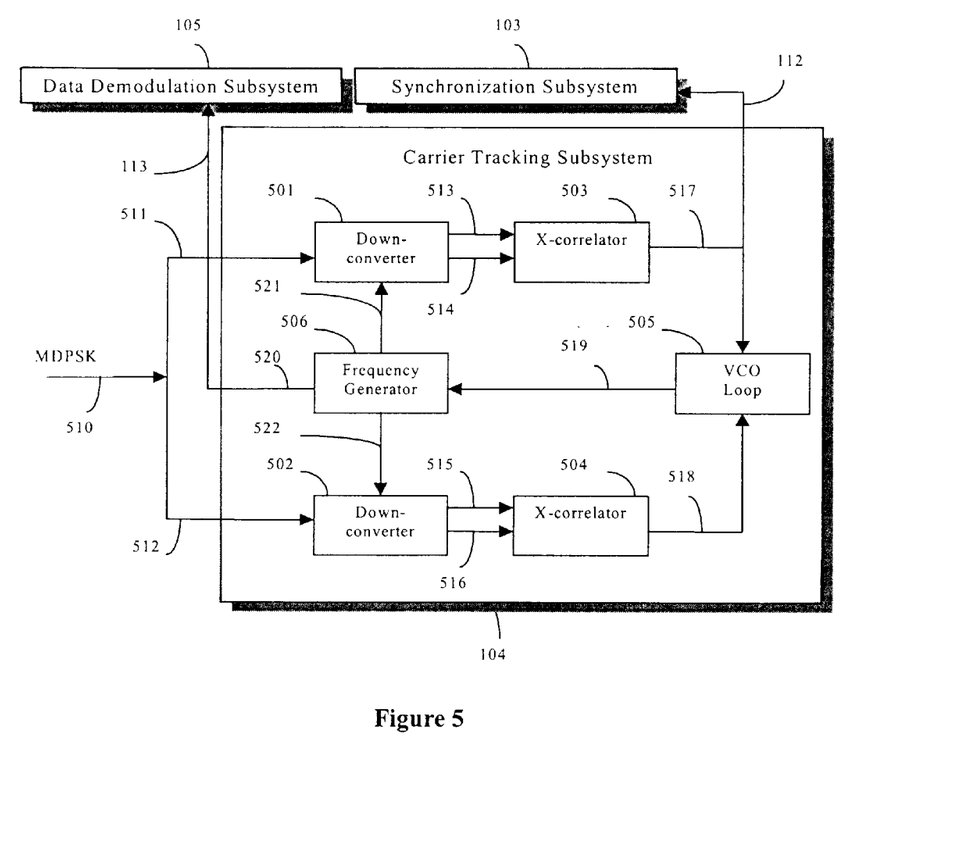
FIG. 5 is the block diagram of the carrier tracking subsystem of FIG. 1.

FIG. 5 shows the block diagram of said carrier tracking subsystem 104 of FIG. 1. The M-ary Differential Phase Shift Keving ("MDPSK") signal 109 is received and split into two symmetric paths, the positive one 511 and the negative one 512. The MDPSK signal 511 is down-converted at the down-converter 501 into base-band I- and Q-path signals 513 and 514, which are supplied to the X-correlator 503, where they are correlated with the local PN-sequence. The output 517 of the X-correlator 503 is fed to the VCO loop 505 as the positive control signal. Signal 517 also acts as said control signal 112 for said synchronization subsystem 103 of FIG. 1. The negative path executes the same operations except that the MDPSK signal 512 is down-converted by the orthogonal carriers 522, the frequency of which is different from that of the positive path. The down-converter 502 supplies the base-band I- and Q-path signal 515 and 516 to the X-correlator 504. The signal 518 obtained from the X-correlator 504 is fed to the VCO loop 505 as the negative control signal. The VCO loop provides a clock signal 519 to the frequency generator 506, which generates three different frequencies, the adjusted carrier frequency 520, the frequency 521 with a positive offset to the frequency 520 and the frequency 522 with the same offset but negative to the frequency 520. The frequency 520 is used as the control signal 113 for the data demodulation subsystem 105 of FIG. 1.

Figure 6:
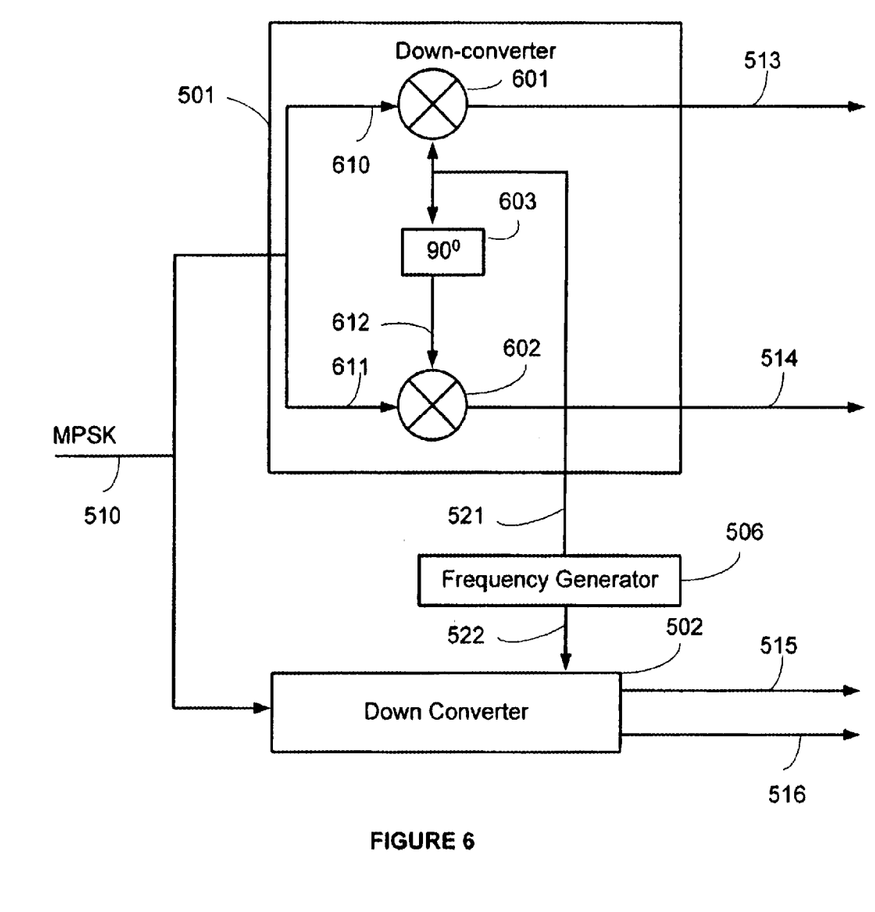
FIG. 6 is the block diagram of the frequency downconverter of FIG. 5.

FIG. 6 shows the block diagram of said down-converters 501 and 502 of FIG. 5. The structure is illustrated with down-converter 501 as follows. The structure of said down-converter 502 is the same. The down-converter includes two multipliers 601 and 602 and a phase shifter 603. The MPSK signal 510 is received and split into two paths 610 and 611. Said frequency signal 521 from said frequency generator 506 of FIG. 5 is fed to said down-converter 501 as a carrier for down-converting the path signal 610 at the multiplier 601, generating the base-band I-path signal 513. Said frequency signal 521 is shifted 90° by the phase shifter 603 and supplied to multiplier 612 for down-converting the path signal 611, generating the base-band Q-path signal 514. Said two base-band path signals 513 and 514 are supplied to the X-correlator 503 of FIG. 5. The base-band I- and Q-path signals 515 and 516 from down-converter 502 are supplied to said X-correlator 504 of FIG. 5.

Figure 7:
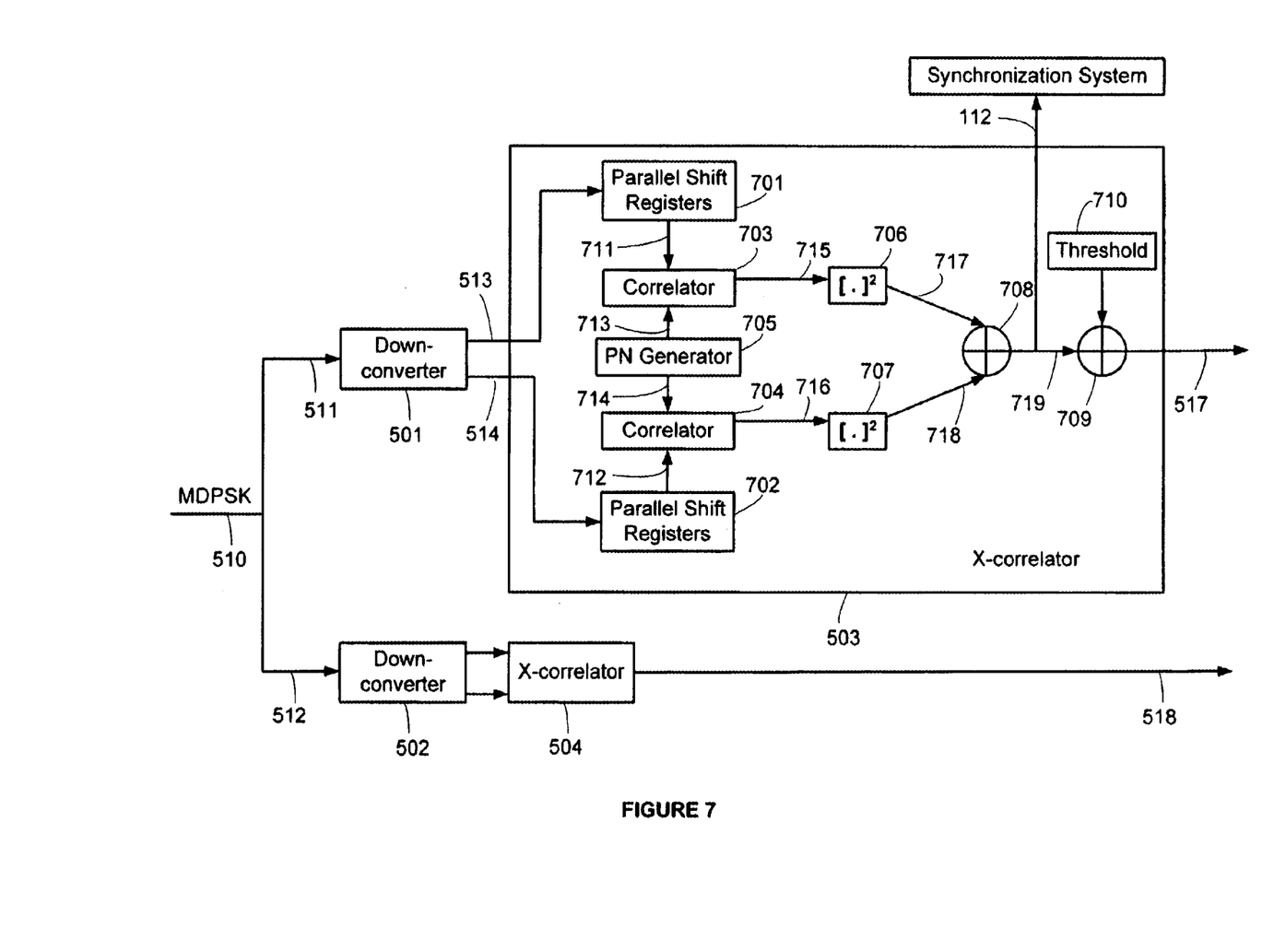
FIG. 7 is the block diagram of the X-correlator of FIG. 5.

FIG. 7 shows the block diagram of said X-correlators 503 and 504 of FIG. 5. The structure is illustrated with said X-correlator 503 as follows. The structure of said X-correlator 504 is the same. The base-band I- and Q-path signals 513 and 514 are supplied to two parallel shift registers 701 and 702. Outputs of said two parallel shift registers 701 and 702 are fed to the correlators 703 and 704, respectively, where they are correlated with the local PN-sequence from the PN-generator 705. The correlation results 715 and 716 are squared at 706 and 707. The results 717 and 718 are combined at adder 708 into signal 719. Said signal 719 is compared with a preset threshold 710, which ensures that the output 517 of the correlator 503 is the correlation peak value. The correlation peak value 518 of the other MPSK signal path 512 is obtained from said X-correlator 504. The two correlation peak values 517 and 518 are supplied to said VCO loop 505 of FIG. 5 as the positive and negative control signals, respectively. Signal 719 is also used as said control signal 112 for the synchronization subsystem 103 of FIG. 1.

Figure 8:
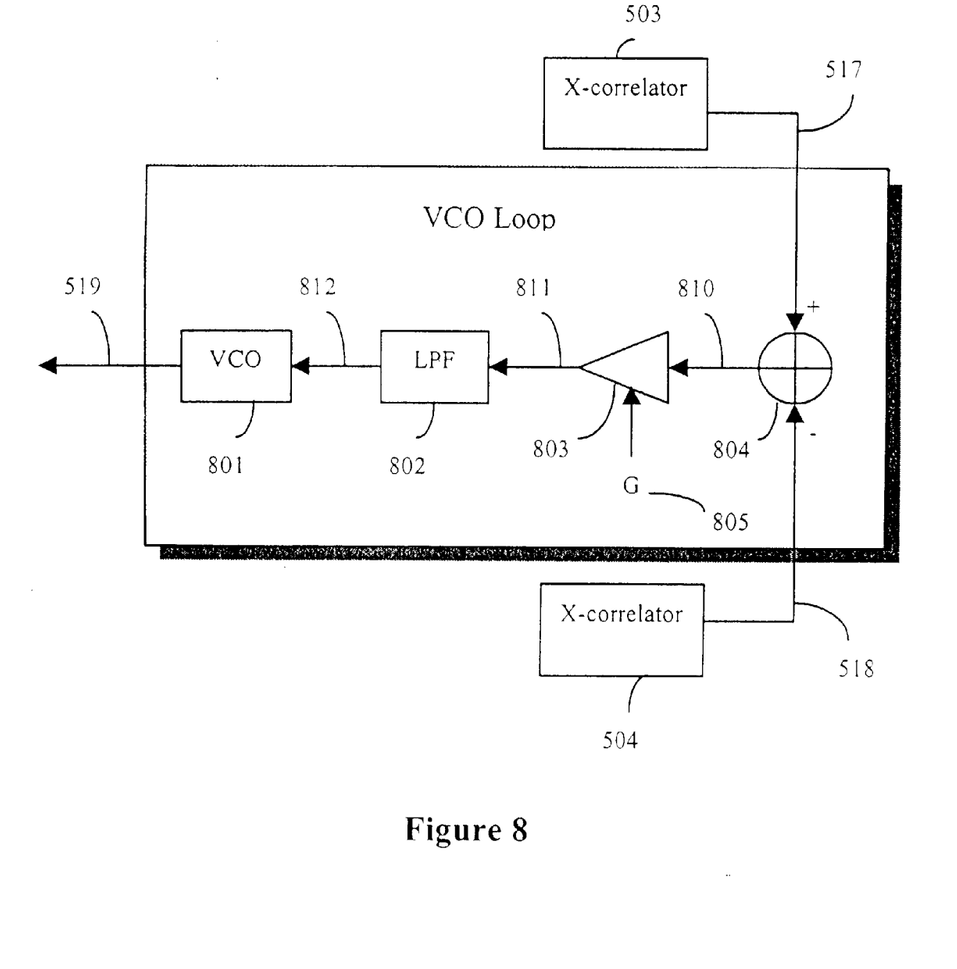
FIG. 8 is the block diagram of the VCO loop of FIG. 5.

FIG. 8 shows the block diagram of said VCO loop 505 of FIG. 5. Said correlation signals 517 and 518 of FIG. 7 act as positive and negative signals for said VCO loop 505. The difference 810 between said correlation signals 517 and 518 is amplified by amplifier 805 with gain G. The amplified signal 811 passes through the low pass filter 802. The output signal 812 of said low pass filter 802 is the error control signal for the voltage controlled oscillator (VCO) 801. Said VCO 801 generates the adjusted frequency clock 519, which is fed to said frequency generator 506 of FIG. 5 for generating the three said adjusted frequencies.

Figure 9:
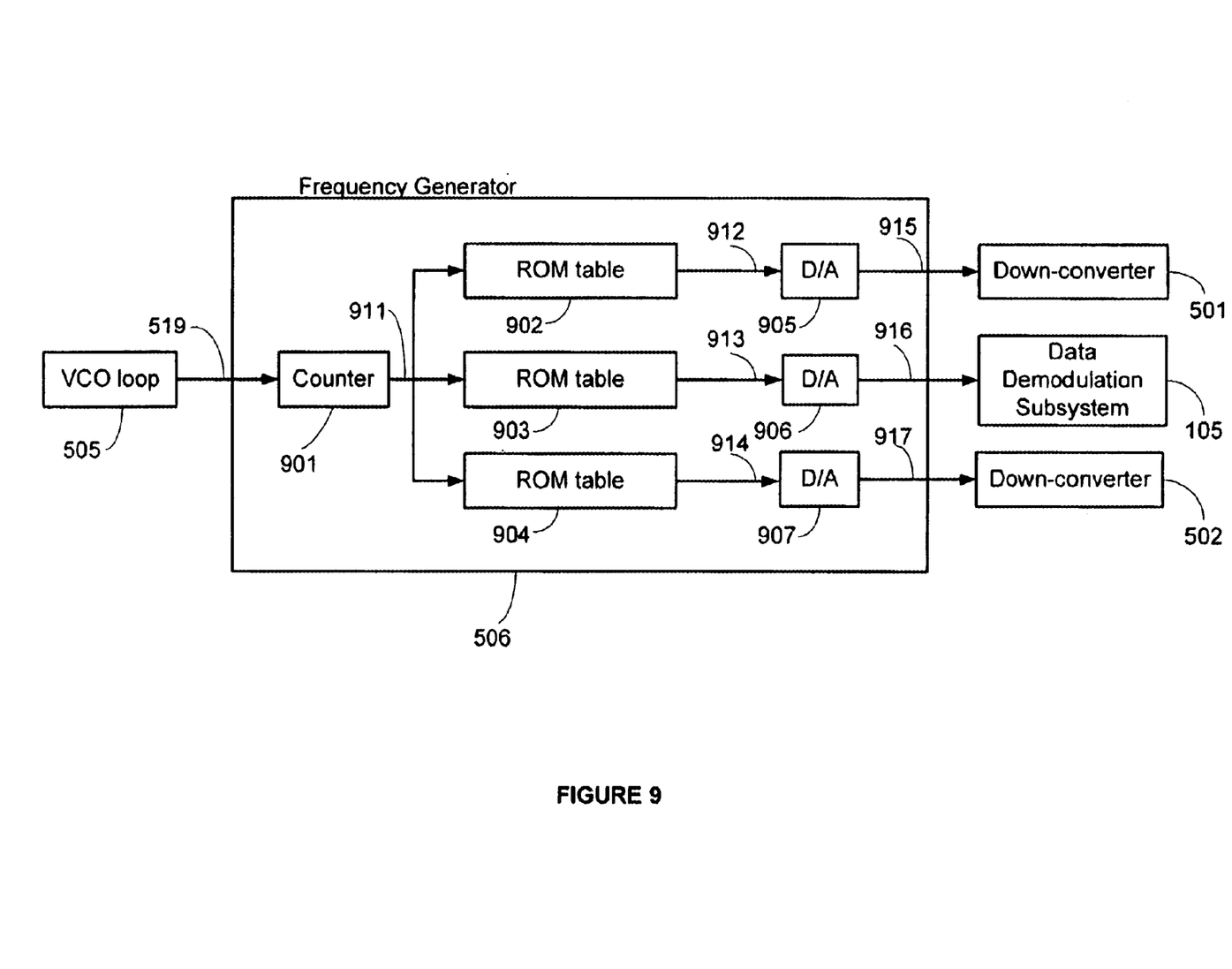
FIG. 9 is the block diagram of the frequency generator of FIG. 5.

FIG. 9 shows the block diagram of said frequency generator 506 of FIG. 5. The VCO loop output clock signal 519 controls the counter 901 for generating addresses to look up ROM tables 902, 903 and 904. Said table 903 stores the values of a cosine waveform of the frequency $f_c$, said table 902 stores the value of the cosine waveform of frequency $f_c$+D and said table 904 stores the value of the cosine waveform of the frequency $f_c$−D, where D represents a positive frequency offset to the frequency $f_c$. Outputs 912, 913 and 914 of said three ROM tables 902, 903 and 904 pass through digital-analogue-converters (D/A) 905, 906 and 907 and are fed to said down-converter 501, said data demodulation subsystem 105 and said down-converter 502, respectively.

Figure 10:
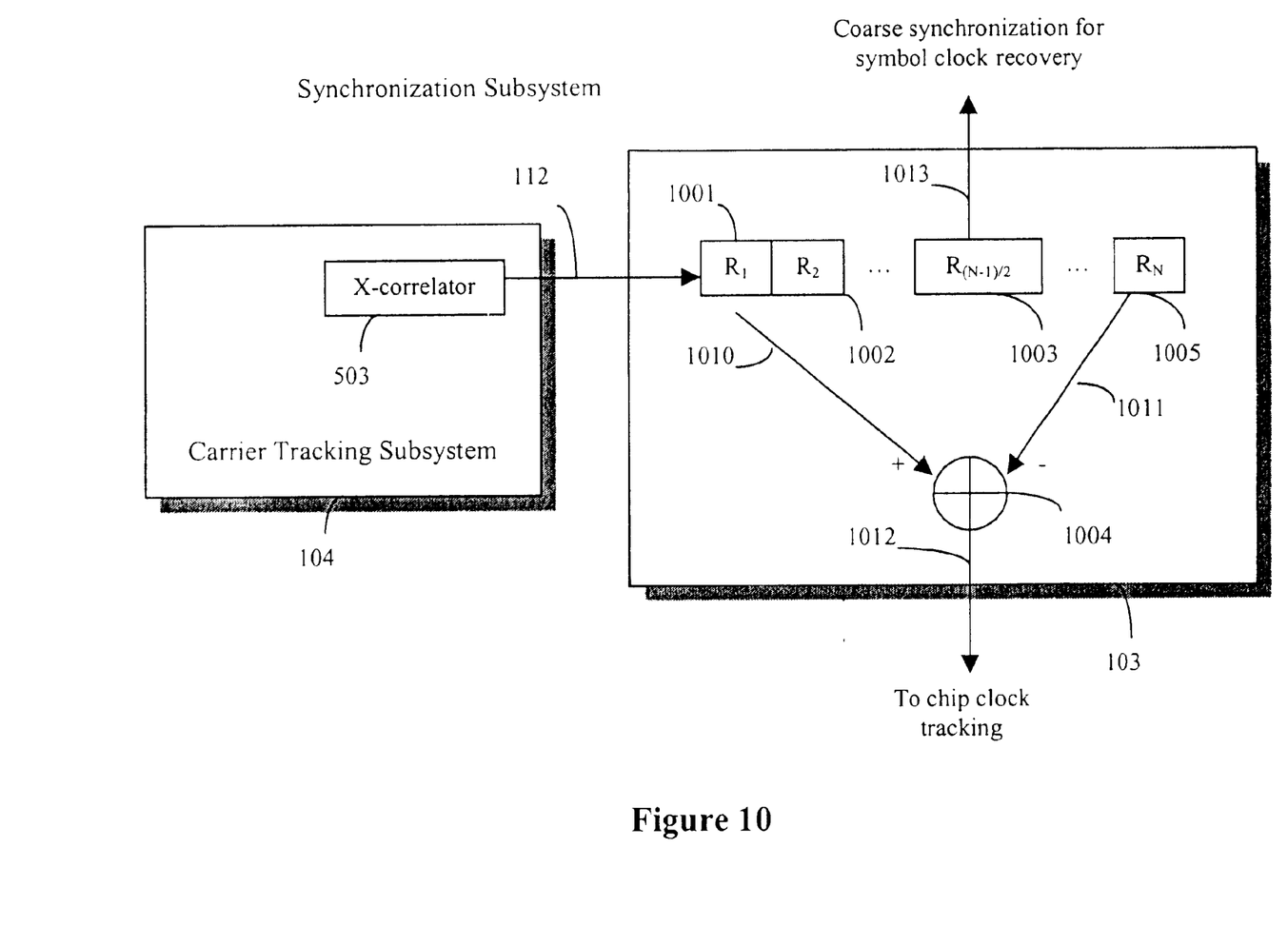
FIG. 10 is the block diagram of the synchronization subsystem of FIG. 1.

FIG. 10 shows the block diagram of said synchronization subsystem 103 of FIG. 1. It comprises N registers $R_1$ 1001, $R_2$ 1002, ..., $R_{(N-1)/2}$ 1003, ..., $R_N$ 1005, and a subtractor 1004, where N represents an odd number. Said signal 112 from the X-correlator 503 of FIG. 7 is sampled N times per chip and the N sampled values are stored in said N registers $R_1, R_2, \ldots, R_{(N-1)/2}, \ldots, R_N$. The difference signal 1012 between the left most value in $R_1$ 1001 and the right most value in $R_N$ 1005 represents the phase error of the chip clock. The middle value in $R_{(N-1)/2}$ 1003 is used for coarse synchronization of the symbol clock.

Figure 11:
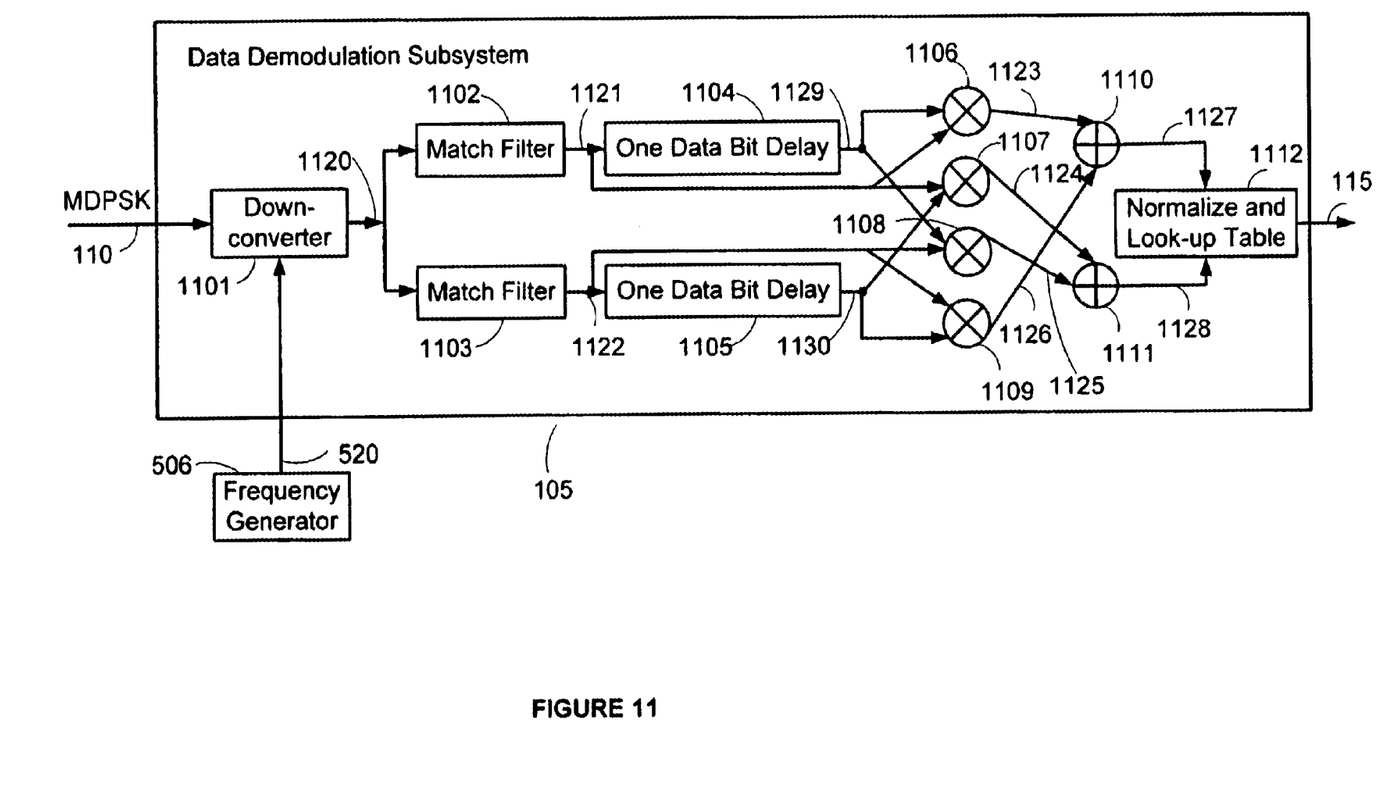
FIG. 11 is the block diagram of the data demodulation subsystem of FIG. 1.

FIG. 11 shows the block diagram of said data demodulation system 105 of FIG. 1. Said MDPSK signal 110 from the transmitter is down-converted at down-converter 1101 by said adjusted carrier 520 from the frequency generator 506 of FIG. 5. The down-converted signal 1120 is split into two paths, which pass through two matched filters 1102 and 1103, respectively. The outputs of said matched filters 1102 and 1103 are delayed for one data bit at 1104 and 1105 to form signals 1129 and 1130. Four multipliers 1106, 1107, 1108 and 1109 are employed. Signals 1129 and 1121 are multiplied at 1106 to form signal 1123, signals 1121 and 1130 are multiplied at 1107 to form 1124, signals 1122 and 1129 are multiplied at 1108 to form 1125, and 1122 and 1130 are multiplied at 1109 to form 1126. Signal 1123 and 1126 are combined at adder 1110 to form signal 1127. Signal 1124 is subtracted from 1125 at subtractor 1111 to form 1128. Said signals 1127 and 1128 are normalized and used for looking up table values at 1112, which stores phases of the MPSK modulation. The result obtained from 1112 is the demodulated data 115 of FIG. 1.

What is claimed is:

1. A broad band spread spectrum communications system wherein a transmitter transits a data modulated MPSK M-ary phase shift keying spread spectrum radio frequency (RF) signal, where m data bits are grouped into one symbol, m=log2M is a positive integer and M is the number of keying: phases of MPSK signals, to a receiver, said receiver comprises:

means for receiving the transmitted data modulated MPSK spread spectrum RF signals, wherein the receiving means comprises a carrier recovery and tracking means, a synchronization means and a data demodulation means, wherein in the means for receiving, the carrier recovery and tracking means comprises:

a frequency generating means which generates three different frequencies fc+D, fc and fc−D, where fc represents the adjusted carrier frequency and D a positive offset to fc;

two RF downconverters, each of which comprises two multipliers and a 90° phase shifter, wherein each down-converter has two inputs, one connected to receive the transmitted data modulated MPSK spread spectrum signals and the other one connected to receive the locally generated carrier from said frequency generating means, and two outputs which provide the I-phase and Q-phase of the base-band signals, wherein at least one downconverter is connected to receive fc+D from said frequency generating means and at least one downconverter is connected to receive fc−D from said frequency generating means; and two X-correlators each of which is connected to receive said I-phase and Q-phase of the base-band signals, wherein the I-phase and Q-phase signals are correlated with the local PN-sequence and the correlation results are processed and outputs from the two X-correlators are used to adjust the frequency generated by a VCO, which output in turn is fed to said frequency generating means.

2. The frequency generating means of claim 1 consists of three ROM look-up tables which store the locally generated carrier clock values, wherein the outputs from look-up tables are converted by D/A converter means to generate three different frequencies fc+D, fc and fc−D, where fc represents the adjusted frequency and D a positive offset to fc.

3. Each X-correlator of claim 1 comprises two shift registers, a PN generator, two correlators, two square operator circuits, two summers and a storage means for storing a threshold value, wherein the parallel shift registers are connected to receive said I-phase and Q-phase of the base-band signals from the RF downconverters, wherein furthermore, received I-phase and Q-phase signals are correlated with the local PN-sequence with results from each of the two correlators squared, summed and compared with a preset threshold value to obtain the correlation peak value such that said correlation peak value is the output of the X-correlator.

4. The frequency generated by said VCO of claim 1 being controlled by two X-correlators such that the difference between output values of the two X-correlators is amplified and averaged by a low pass filter to form an error signal, wherein the error signal is fed to the input of the VCO with the VCO frequency clock is increased when the error is positive and decreased when the error is negative.

5. The receiving means of claim 1, wherein the synchronization means comprises N storage means, R1, R2, ..., RN, and a subtractor where N is an odd number, wherein the output from one of the said X-correlators is sampled N times per chip, where N is an odd integer greater or equal to three, wherein the sampled values are stored in sequence in the N-storage means R1, R2, ..., RN, wherein a difference between the sample stored in R1 and the sample store in RN forms the phase error of the chip clock, and wherein furthermore, sample store in R(N−1)/2 is used for coarse synchronization of the symbol clock.

6. The receiving means of claim 1, wherein the data demodulation means comprises:

a RF down-converter, which includes a 90° phase shifter connected to receive the transmitted data modulated MPSK spread spectrum signal, the down-converter having two inputs such that one input is connected to receive the transmitted data modulated MPSK spread spectrum signals and another input is connected to receive the locally generated carrier fc from a frequency generator, and wherein two outputs of the RF down-converter provide the I- and Q-phases of the base-band signals;

two match filters each connected to said I-phase and Q-phases of the base-band signals;

two one-data-bit-line each connected to the outputs of said match filters; and four multipliers, two summers and a phase-table for storing the M-phase values of MPSK modulation.

7. Data demodulation in the data demodulation means of claim 6 comprises comprising the following steps:

down converting the received data modulated MPSK spread spectrum RF signal by the carrier frequency fc from said frequency generator of claim 2 into I-channel and Q-channel signals;

de-spreading via said match filters said I-channel and Q-channel signals;

multiplying said de-spreaded I-channel and Q-channel signals by their own one-bit-delayed signal and then summing these two multiplications to produce the real-part of the phase information for demodulation, which is denoted by COS;

multiplying said de-spreaded I-channel signal is multiplied with the one-bit-delayed said de-spreaded Q-channel signal;

multiplying the de-spreaded Q-channel signal with the one-bit-delayed said de-spreaded I-channel signal;

producing by taking the difference between the two multiplications to produce the imaginary-part of the phase information for demodulation, which is denoted by SIN;

forming with said SIN and COS signals a phase pair (COS, SIN);

comparing after normalization, a phase pair (COS, SIN) norm with modulating phases stored in said phase-table of claim 6; and choosing a phase from the phase table as the demodulating phase such that it is closest to the phase pair (COS, SIN)norm.

8. Employing the Euler distance measure as a measure of closeness of said (COS, SIN)norm with phases stored in said phase-table in claim 7.

* * * * *

UNITED STATES PATENT AND TRADEMARK OFFICE
CERTIFICATE OF CORRECTION

PATENT NO.   : 6,704,344 B1
DATED        : March 9, 2004
INVENTOR(S)  : Aiqun Hu, T.S. Ng and Jeff D.H. Guo It is certified that error appears in the above-identified patent and that said Letters Patent is hereby corrected as shown below:

<u>Title page,</u>
Item [73], Assignee, insert -- The University of Hong Kong, Hong Kong, China --.

Signed and Sealed this

Thirty-first Day of August, 2004

JON W. DUDAS
*Director of the United States Patent and Trademark Office*